United States Patent
Hwang et al.

(10) Patent No.: US 11,642,955 B1
(45) Date of Patent: May 9, 2023

(54) POWER TRANSMISSION APPARATUS OF A HYBRID ELECTRIC VEHICLE

(71) Applicants: HYUNDAI MOTOR COMPANY, Seoul (KR); KIA CORPORATION, Seoul (KR)

(72) Inventors: Seong Wook Hwang, Gunpo-si (KR); Tae Whan Kim, Yongin-si (KR); Youngbae Ryu, Seongnam-si (KR); Jong Hyo Park, Osan-si (KR); Hyung-Min Kim, Suwon-si (KR); Juhyeon Park, Hwaseong-si (KR); YongDal Choi, Suwon-si (KR); Jaewook Lee, Seongnam-si (KR); Wonmin Cho, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/685,804

(22) Filed: Mar. 3, 2022

(30) Foreign Application Priority Data

Dec. 22, 2021 (KR) .......................... 10-2021-0184633

(51) Int. Cl.
| | | |
|---|---|---|
| *B60K 6/36* | (2007.10) |
| *B60K 6/365* | (2007.10) |
| *B60K 6/383* | (2007.10) |
| *B60K 6/442* | (2007.10) |
| *B60K 6/26* | (2007.10) |
| *B60K 6/38* | (2007.10) |

(52) U.S. Cl.
CPC ................ *B60K 6/365* (2013.01); *B60K 6/26* (2013.01); *B60K 6/383* (2013.01); *B60K 6/442* (2013.01); *B60K 2006/381* (2013.01)

(58) Field of Classification Search
CPC ........ B60K 6/365; B60K 6/383; B60K 6/442; F16H 63/32
See application file for complete search history.

(56) References Cited

U.S. PATENT DOCUMENTS

| | | | | |
|---|---|---|---|---|
| 9,969,255 B2 * | 5/2018 | Kim | .......................... | B60K 6/40 |
| 10,023,040 B2 * | 7/2018 | Kim | .......................... | B60K 6/365 |
| 10,260,618 B2 * | 4/2019 | Chae | .......................... | F16H 1/28 |
| 10,371,218 B2 * | 8/2019 | Kim | .......................... | B60K 6/387 |
| 11,260,741 B2 * | 3/2022 | Li | .......................... | B60K 1/02 |
| 2019/0202278 A1 * | 7/2019 | Kim | .......................... | B60K 6/445 |

* cited by examiner

*Primary Examiner* — Derek D Knight
(74) *Attorney, Agent, or Firm* — Lempia Summerfield Katz LLC

(57) ABSTRACT

A power transmission apparatus of a hybrid vehicle having an engine and first and second motor-generators includes: a planetary gear set disposed on a first motor shaft of the first motor-generator, and including a planet carrier connected to an engine shaft, a sun gear connected to the first motor shaft, and a ring gear connected to a drive gear through a one-way clutch, a second motor shaft gear connected to a second motor shaft of the second motor-generator, an output shaft disposed between the engine shaft and the second motor shaft, and a brake unit to selectively connect the sun gear and the ring gear to a transmission housing. In particular, the output shaft is externally gear-meshed with the drive gear and the second motor shaft gear respectively through a driven gear, and externally gear-meshed with a final reduction gear of the differential gear through an output gear.

6 Claims, 6 Drawing Sheets

FIG. 2

| Mode | | Operation element | OWC | Brake unit | | | Remark |
|---|---|---|---|---|---|---|---|
| | | | | BG1 | N | BG2 | |
| EV | | MG2 | – | – | – | – | |
| HEV | SERIES | MG2 | – | – | – | ● | Engine and MG1 are driven to generate electricity |
| | E-CVT | Engine, MG1 | ● | – | ● | – | Engine torque is partially input to MG1 to generate electricity |
| | PARALLEL | Engine, MG2 | ● | ● | – | – | Torque assistance of MG2 |

POWER TRANSMISSION APPARATUS OF A HYBRID ELECTRIC VEHICLE

CROSS-REFERENCE TO RELATED APPLICATION

This application claims priority to and the benefit of Korean Patent Application No. 10-2021-0184633, filed on Dec. 22, 2021, the entire contents of which are incorporated herein by reference.

BACKGROUND

(a) Field

The present disclosure relates to a power transmission apparatus of a hybrid vehicle.

(b) Description of the Related Art

An environmentally-friendly technology of a vehicle is a core technology which controls survival of a future automobile industry, and advanced car makers have focused their energy on the development of an environmentally-friendly vehicle to achieve environmental and fuel efficiency regulations.

Therefore, car makers have developed an electric vehicle (EV), a hybrid electric vehicle (HEV), a fuel cell electric vehicle (FCEV), and the like, as future vehicle technologies.

Since the future vehicle has various technological restrictions such as a weight and cost, the vehicle makers have paid attention to the hybrid electric vehicle as an alternative of a realistic problem for meeting exhaust gas regulations and improving fuel efficiency performance and have entered into keen competition for commercializing the hybrid electric vehicle.

The hybrid electric vehicle is a vehicle using two or more power sources. Two or more power sources may be combined by various schemes and a gasoline engine or a diesel engine using the existing fossil fuel and a motor/generator driven by electric energy are mixed and used as the power sources.

In the hybrid electric vehicle, an EV mode in which the hybrid electric vehicle is driven by only the motor, an HEV mode using both the engine and the motor, and an ENG mode using only the engine can be implemented according to the combination of the engine and the motor.

Further, the hybrid electric vehicle can provide a significant improvement of fuel efficiency through an idle stop function of stopping the engine when the vehicle stops, and also through a regenerative braking, where a motor/generator is driven as a generator to generate electricity by a kinetic energy of the vehicle under a braking situation, such generated electricity is stored in a battery, and the stored electricity is reused in driving the vehicle.

The above information disclosed in this Background section is only for enhancement of understanding of the background of the present disclosure, and therefore it may contain information that does not form the prior art that is already known to a person of ordinary skill in the art.

SUMMARY

In one embodiment of the present disclosure, a power transmission apparatus of a hybrid vehicle having an engine and first and second motor-generators includes: a planetary gear set disposed on a first motor shaft of the first motor-generator, and including a planet carrier fixedly connected to an engine torque shaft, a sun gear fixedly connected to the first motor shaft, and a ring gear connected to a drive gear through a one-way clutch, a second motor shaft gear fixedly connected to a second motor shaft of the second motor-generator, an output shaft disposed in parallel to and between the engine torque shaft and the second motor shaft, externally gear-meshed with the drive gear and the second motor shaft gear respectively through a driven gear, and externally gear-meshed with a final reduction gear of the differential gear through an output gear, and a brake unit configured to selectively connect the sun gear and the ring gear to a transmission housing to act as a fixed element.

The planetary gear set may be a single pinion planetary gear set.

The engine torque shaft and the first motor shaft may be disposed on a same axis. The second motor shaft may be disposed in parallel with the first motor shaft.

The ring gear may be configured to transfer one directional torque to the drive gear through the one-way clutch.

In one embodiment, the brake unit may include: a first brake gear fixedly connected to the first motor shaft, a second brake gear fixedly connected to the ring gear, a fixed drum provided with a spline portion formed in an interior circumference of the fixed drum and fixed to the transmission housing, and a sleeve which is disposed between the first and second brake gears, spline-coupled to the spline portion of the fixed drum through a spline tooth to be movable in an axial direction, and selectively engaged with the first brake gear or the second brake gear.

The brake unit may further include an actuator connected to a pocket formed in the sleeve through a finger and configured to provide a longitudinal operation force to the sleeve such that the sleeve may be selectively engaged with the first brake gear or second brake gear.

According to an embodiment of the present disclosure, a power transmission apparatus of a hybrid vehicle enables shifting of the engine speed to an increased speed for a high speed or medium speed driving, thereby improving fuel efficiency.

In addition, the one-way clutch for transferring the one directional torque of the ring gear is disposed on an exterior circumference of the planetary gear set, thereby improving installability.

In addition, instead of employing conventional wet-type brakes, the sleeve and the first and second brake gears are used, and therefore a hydraulic system such as hydraulic pressure lines may be excluded in the transmission, thereby providing advantage in the transmission layout.

In addition, in the HEV E-CVT mode as well as in the HEV SERIES mode, the torque of the engine is input to the first motor-generator at least in part to generate electricity, thereby enhancing energy regeneration efficiency.

In addition, in the HEV PARALLEL mode, a sufficient driving torque may be achieved by the torque assistance of the second motor-generator, for example, on a sloped road.

Other effects that may be obtained or are predicted by an exemplary embodiment should be explicitly or implicitly described in a detailed description of the present disclosure.

BRIEF DESCRIPTION OF THE DRAWINGS

In order that the disclosure may be well understood, there will now be described various forms thereof, given by way of example, reference being made to the accompanying drawings, in which:

FIG. 2 is an operational chart of a power transmission apparatus of a hybrid vehicle according to an exemplary embodiment.

Figure 1:
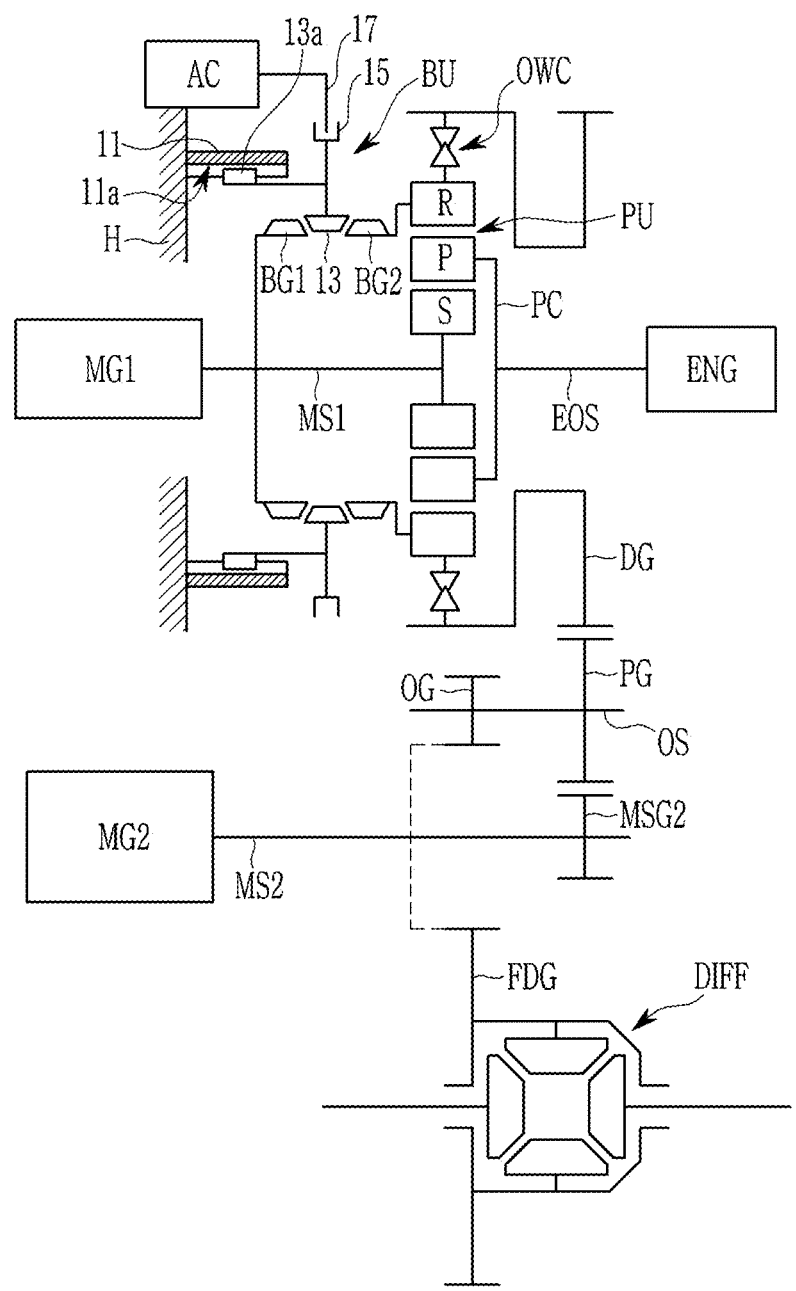
FIG. 1 is a schematic diagram of a power transmission apparatus of a hybrid vehicle according to an exemplary embodiment.

The drawings described herein are for illustration purposes only and are not intended to limit the scope of the present disclosure in any way.

DETAILED DESCRIPTION

The present disclosure is described more fully hereinafter with reference to the accompanying drawings, in which exemplary embodiments of the present disclosure are shown. As those having ordinary skill in the art would realize, the described embodiments may be modified in various different ways, all without departing from the spirit or scope of the present disclosure.

In order to clarify the present disclosure, parts that are not related to the description are omitted, and the same elements or equivalents are referred to with the same reference numerals throughout the specification.

In the following description, dividing names of components into first, second, and the like is to divide the names because the names of the components are the same as each other, and an order thereof is not particularly limited.

FIG. 1 is a schematic diagram of a power transmission apparatus of a hybrid vehicle according to an exemplary embodiment.

Referring to FIG. 1, a power transmission apparatus of a hybrid vehicle is coupled to an engine ENG and first and second motor-generators MG1 and MG2, which are power sources of the hybrid vehicle.

In one embodiment, the power transmission apparatus includes a planetary gear set PU configured to combine the torque of the engine ENG and the torque of the first motor-generator MG1, a second motor shaft gear MSG2, an output shaft OS which receives torques from the planetary gear set PU and the second motor-generator MG2 and outputs an output torque to a differential gear DIFF, and a brake unit BU.

The engine ENG is a power source, and may be implemented as one of various types such as a gasoline engine or a diesel engine.

The first and second motor-generators MG1 and MG2 are also power sources, and may function as a motor and a generator. Each of the first and second motor-generators MG1 and MG2 includes a stator fixed to a transmission housing H and a rotor rotatably supported at a radially interior side of the stator.

In another embodiment, the planetary gear set PU is a single pinion planetary gear set, and includes a sun gear S, a planet carrier PC, and a ring gear R. The planet carrier PC rotatably supports a plurality of pinion gears P externally gear-meshed with the sun gear S. The ring gear R is internally gear-meshed with the plurality of pinion gears P.

The torque of the engine ENG is input to an engine torque shaft EOS, and the engine torque shaft EOS is disposed on the same axis as a first motor shaft MS1 of the first motor-generator MG1.

The planetary gear set PU is disposed on the first motor shaft MS1.

One form, in the planetary gear set PU, the sun gear S is fixedly connected to the first motor shaft MS1, and at the same time, selectively connected to the transmission housing H through the brake unit BU, so as to selectively act as a fixed element.

In addition, the planet carrier PC is fixedly connected to the engine torque shaft EOS to receive the torque of the engine ENG.

In addition, the ring gear R is connected to a drive gear DG interposing a one-way clutch OWC, and at the same time, selectively connected to the transmission housing H through the brake unit BU, to selectively act as a fixed element.

In one form, the one-way clutch OWC is disposed exterior to the ring gear R, and transfers one directional torque from the ring gear R to the drive gear DG.

It may be understood that the planetary gear set PU receives torques through the sun gear S and the planet carrier PC and is configured to vary the received torque (by increasing or decreasing the speed) and to output the varied torque through the ring gear R.

In addition, the second motor shaft gear MSG2 is fixedly connected to a second motor shaft MS2 of the second motor-generator MG2. Here, the second motor shaft MS2 is disposed in parallel with the first motor shaft MS1.

The output shaft OS is disposed in parallel to and between the engine torque shaft EOS and the second motor shaft MS2. And the output shaft OS is provided with an output gear OG that is fixed to the output shaft OS and externally gear-meshed with a final reduction gear FDG of the differential gear DIFF.

In addition, the output shaft OS is also provided with a driven gear PG that is fixed to the output shaft OS, and the driven gear PG is externally gear-meshed with the drive gear DG and the second motor shaft gear MSG2, respectively.

That is, the output shaft OS receives torques from the planetary gear set PU and the second motor-generator MG2 through the driven gear PG, and outputs the received torque to the differential gear DIFF through the output gear OG.

Gear ratios between the drive gear DG, the driven gear PG, and the second motor shaft gear MSG2 may be appropriately set according to desired feature of the transmission.

In one form, the brake unit BU includes first and second brake gears BG1 and BG2, a fixed drum 11, a sleeve 13, and an actuator AC.

The first and second brake gears BG1 and BG2 are disposed on the first motor shaft MS1.

The first brake gear BG1 is fixedly connected to the first motor shaft MS1.

The second brake gear BG2 is fixedly connected to the ring gear R of the planetary gear set PU.

A spline portion 11a is formed on an interior circumference of the fixed drum 11, and is fixed to the transmission housing H.

The sleeve 13 is disposed between the first and second brake gears BG1 and BG2. In addition, the sleeve 13 is spline-coupled to the spline portion 11a of the fixed drum 11 through a spline tooth 13a so as to be movable in an axial direction.

The sleeve 13 may be selectively engaged with the first brake gear BG1 or second brake gear BG2 as the spline tooth 13a moves in the axial direction along the spline portion 11a of the fixed drum 11.

In addition, the actuator AC is connected to a pocket 15 formed at the sleeve 13 through a finger 17.

The actuator AC provides a longitudinal operation force to the sleeve 13 such that the sleeve 13 may be selectively engaged with the first brake gear BG1 or second brake gear BG2.

FIG. 2 is an operational chart of a power transmission apparatus of a hybrid vehicle according to an exemplary embodiment. FIG. 3 to FIG. 6 respectively illustrate a power flow in shifting modes of a power transmission apparatus of a hybrid vehicle according to an exemplary embodiment.

Referring to FIG. 2 and FIG. 3 to FIG. 6, according to operations of the engine ENG and the first and second motor-generators MG1 and MG2 and an operation of the brake unit BU, four operation modes may be achieved as follows.

[EV Mode]

Figure 3:
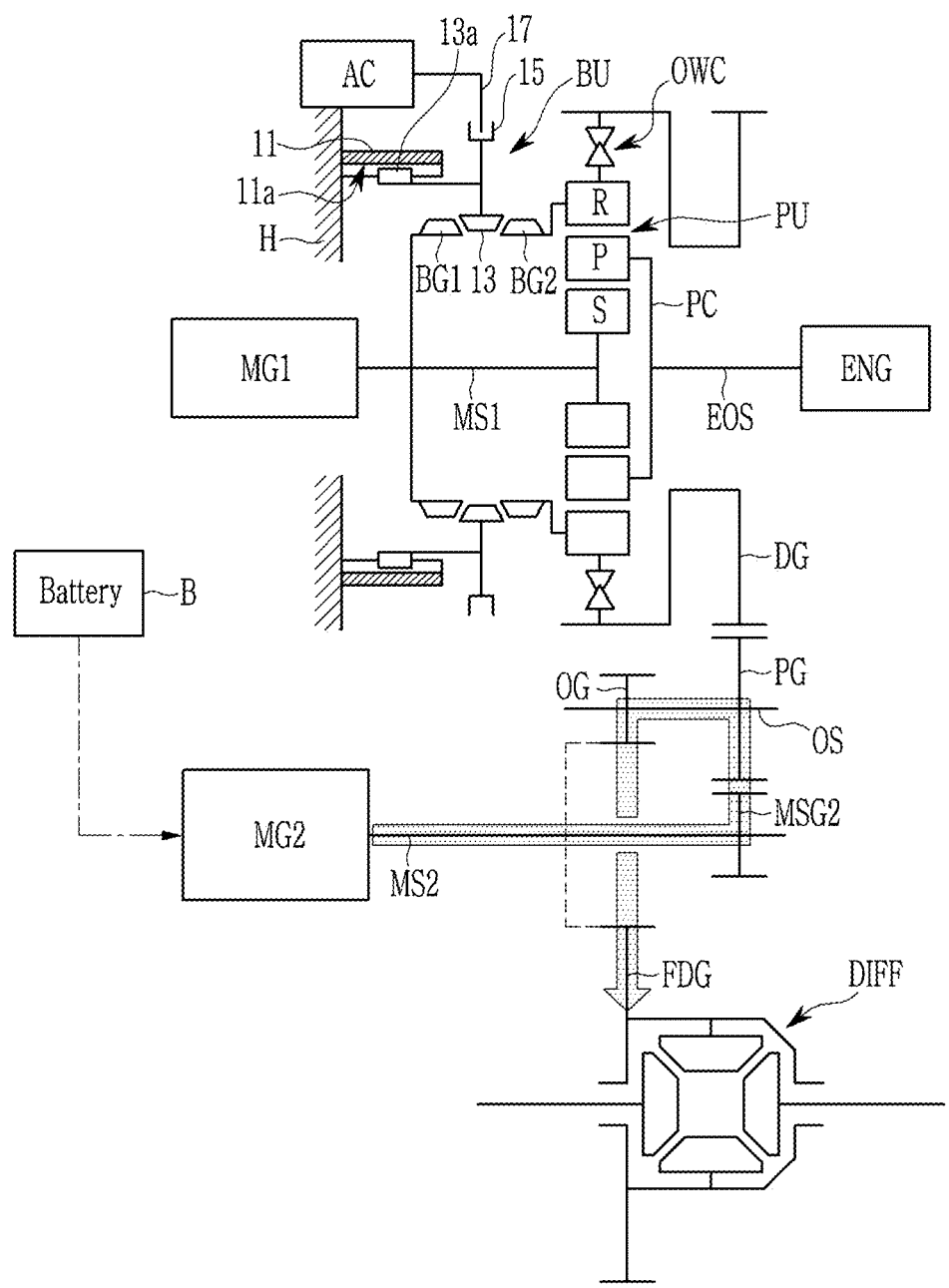
FIG. 3 to FIG. 6 respectively illustrate a power flow in shifting modes of a power transmission apparatus of a hybrid vehicle according to some exemplary embodiments.

Referring to FIG. 2 and FIG. 3, in the EV mode, in a neutral state where the sleeve 13 is not engaged with the first and second brake gears BG1 and BG2 without an operation of the actuator AC, the operation of the engine ENG is stopped, and the second motor-generator MG2 rotates in a first direction (i.e., a forward driving direction).

Then, the second motor-generator MG2 is operated by electrical energy of a battery (not shown), and the torque of the second motor-generator MG2 is transferred to the differential gear DIFF through the second motor shaft MS2, the second motor shaft gear MSG2, the driven gear PG, the output shaft OS, the output gear OG, and the final reduction gear FDG, thereby realizing the EV mode.

For example, the EV mode may be achieved in a low speed driving below 30 km/h.

In addition, driving rearward may be enabled when the second motor-generator MG2 rotates in a second direction (i.e., a backward driving direction) in the above condition.

[HEV Series Mode]

Figure 4:
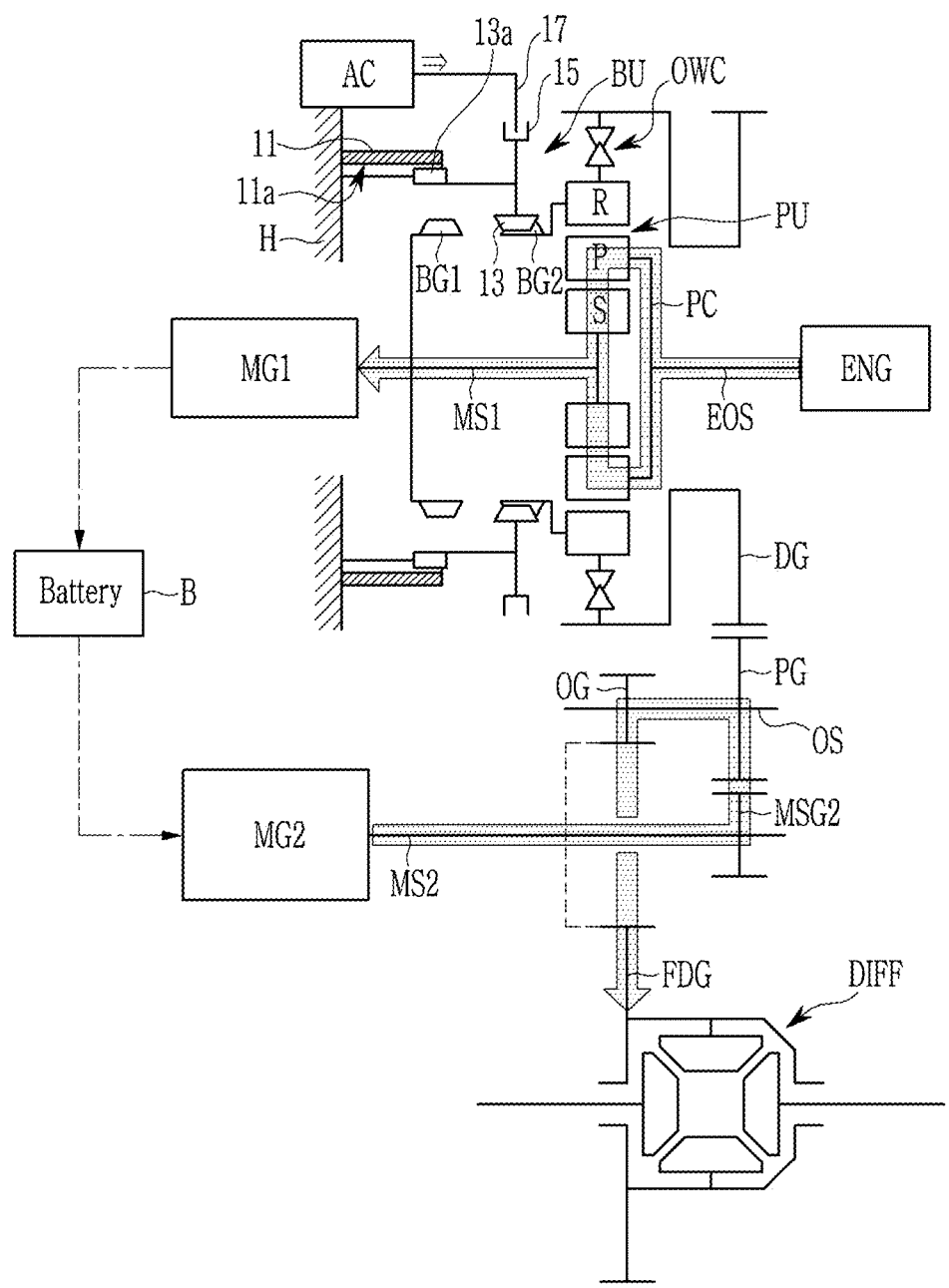

Referring to FIG. 2 and FIG. 4, in the HEV SERIES mode, while the sleeve 13 is engaged with the second brake gear BG2 by the operation of the actuator AC, the engine ENG and the first and second motor-generators MG1 and MG2 are all driven.

Then, in the planetary gear set PU, the ring gear R acts as a fixed element. Accordingly, the torque of the engine ENG is input to the planet carrier PC of the planetary gear set PU through the engine torque shaft EOS and the rotation speed increases. And the increased speed is output to the first motor shaft MS1 of the first motor-generator MG1 through the sun gear S.

Accordingly, the first motor-generator MG1 is operated to generate electricity to recharge the battery by the entire torque of the engine ENG, and the electrical energy recharged in the battery is used to drive the second motor-generator MG2.

In other words, the torque of the second motor-generator MG2 is transferred to the differential gear DIFF through the second motor shaft MS2, the second motor shaft gear MSG2, the driven gear PG, the output shaft OS, the output gear OG, and the final reduction gear FDG, thereby realizing the HEV SERIES mode.

[HEV E-CVT Mode]

Figure 5:
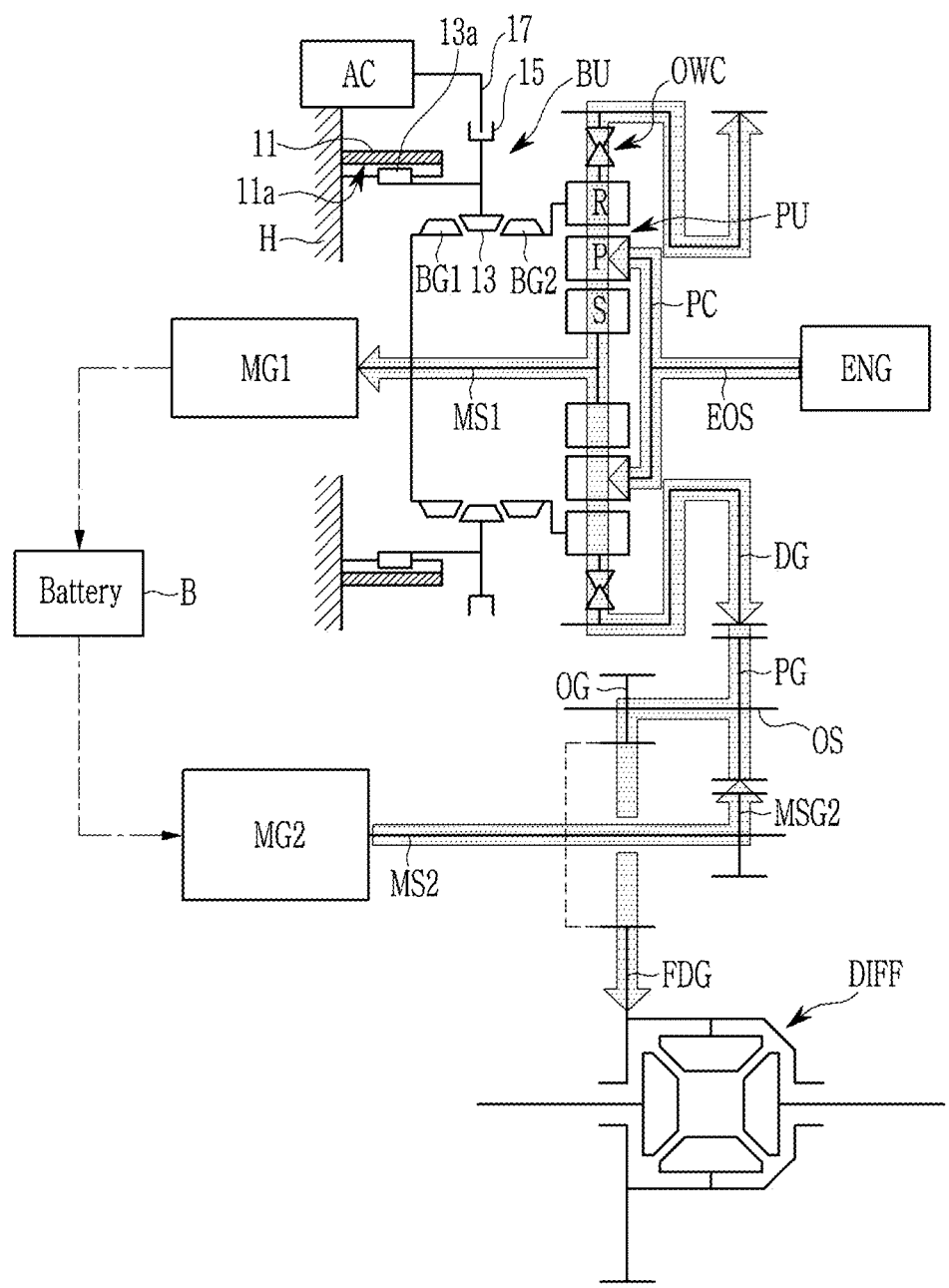

Referring to FIG. 2 and FIG. 5, in the HEV E-CVT mode, in a neutral state where the sleeve 13 is not engaged with the first and second brake gears BG1 and BG2 without an operation of the actuator AC, the one-way clutch OWC functions, and the engine ENG and the second motor-generator MG2 are operated.

Then, the torque of the engine ENG is input to the planet carrier PC of the planetary gear set PU through the engine torque shaft EOS. Accordingly, some of the engine torque is provided to the first motor shaft MS1 of the first motor-generator MG1 through the sun gear S. And the other of the engine torque is output to the drive gear DG that is connected to the ring gear R of the planetary gear set PU through the one-way clutch OWC.

Accordingly, the first motor-generator MG1 may be driven to generate electricity to recharge the battery by the partial torque of the engine ENG.

In addition, the torque of the engine ENG output to the drive gear DG is combined with the torque of the second motor-generator MG2 at the driven gear PG, and transferred to the differential gear DIFF through the output shaft OS, the output gear OG, and the final reduction gear FDG, thereby realizing the HEV E-CVT mode.

[HEV Parallel Mode]

Figure 6:
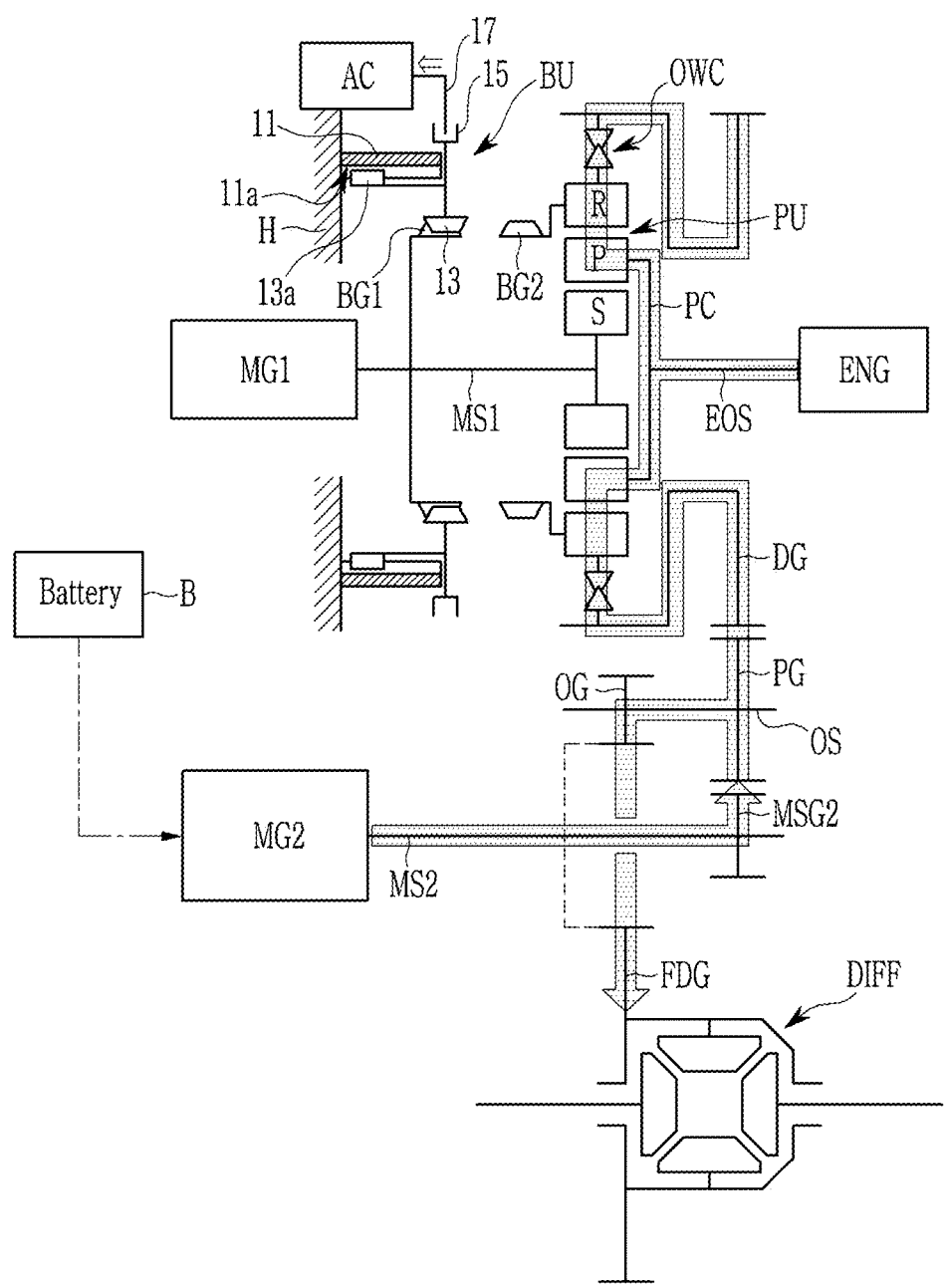

Referring to FIG. 2 and FIG. 6, in the HEV PARALLEL mode, while the sleeve 13 is engaged with the first brake gear BG1 by the operation of the actuator AC, the one-way clutch OWC functions, and the engine ENG and the second motor-generator MG2 are operated.

In one form, in the planetary gear set PU, the sun gear S acts as a fixed element. Accordingly, the torque of the engine ENG is input to the planet carrier PC of the planetary gear set PU through the engine torque shaft EOS and the rotation speed increases, and the increased speed is output through the ring gear R of the planetary gear set PU to the drive gear DG connected to the one-way clutch OWC.

In addition, the torque of the engine ENG output to the drive gear DG is combined with the torque of the second motor-generator MG2 at the driven gear PG, and transferred to the differential gear DIFF through the output shaft OS, the output gear OG, and the final reduction gear FDG, thereby realizing the HEV PARALLEL mode.

At this time, the operation of the second motor-generator MG2 may be an operation for torque assistance of the engine ENG.

As described above, a power transmission apparatus of a hybrid vehicle according to an exemplary embodiment enables shifting of the engine speed to an increased speed for a high speed or medium speed driving, thereby improving fuel efficiency.

In addition, the one-way clutch OWC for transferring the one directional torque of the ring gear R is disposed on an exterior circumference of the planetary gear set PU, thereby improving installability.

In addition, instead of employing conventional wet-type brakes, the sleeve 13 and the first and second brake gears BG1 and BG2 are used, and therefore a hydraulic system such as hydraulic pressure lines may be excluded in the transmission, thereby providing advantage in the transmission layout.

In addition, in the HEV E-CVT mode as well as in the HEV SERIES mode, the torque of the engine ENG is input to the first motor-generator MG1 at least in part to generate electricity, thereby enhancing energy regeneration efficiency.

In addition, in the HEV PARALLEL mode, a sufficient driving torque may be achieved by the torque assistance of the second motor-generator MG2, for example, on a sloped road.

While this present disclosure has been described in connection with what is presently considered to be practical exemplary embodiments, it is to be understood that the present disclosure is not limited to the disclosed embodiments. On the contrary, it is intended to cover various modifications and equivalent arrangements included within the spirit and scope of the present disclosure.

DESCRIPTION OF SYMBOLS

ENG: engine
EOS: engine torque shaft
MG1, MG2: first and second motor-generators
MS1, MS2: first, second motor shaft
MSG2: second motor shaft gear
DG: drive gear
PG: driven gear
OS: output shaft
OG: output gear
OWC: one-way clutch
PU: planetary gear set
BU: brake unit
BG1, BG2: first and second brake gears
11: fixed drum
13: sleeve
AC: actuator
15: pocket
17: finger

What is claimed is:

1. A power transmission apparatus of a hybrid vehicle having an engine and first and second motor-generators, the power transmission apparatus comprising:
　a planetary gear set disposed on a first motor shaft of the first motor-generator and including:
　　a planet carrier fixedly connected to an engine torque shaft,
　　a sun gear fixedly connected to the first motor shaft, and
　　a ring gear connected to a drive gear through a one-way clutch;
　a second motor shaft gear fixedly connected to a second motor shaft of the second motor-generator;
　an output shaft disposed in parallel to and between the engine torque shaft and the second motor shaft, externally gear-meshed with the drive gear and the second motor shaft gear respectively through a driven gear, and externally gear-meshed with a final reduction gear of a differential gear through an output gear; and
　a brake unit configured to selectively connect the sun gear and the ring gear to a transmission housing to act as a fixed element.

2. The power transmission apparatus of claim 1, wherein the planetary gear set is a single pinion planetary gear set.

3. The power transmission apparatus of claim 1, wherein:
　the engine torque shaft and the first motor shaft are disposed on a same axis; and
　the second motor shaft is disposed in parallel with the first motor shaft.

4. The power transmission apparatus of claim 1, wherein the ring gear is configured to transfer one directional torque to the drive gear through the one-way clutch.

5. The power transmission apparatus of claim 1, wherein the brake unit comprises:
　a first brake gear fixedly connected to the first motor shaft;
　a second brake gear fixedly connected to the ring gear;
　a fixed drum provided with a spline portion formed in an interior circumference thereof and fixed to the transmission housing; and
　a sleeve disposed between the first and second brake gears and spline-coupled to the spline portion of the fixed drum through a spline tooth, the sleeve configured to move in an axial direction and selectively engage with the first brake gear or the second brake gear.

6. The power transmission apparatus of claim 5, wherein the brake unit further comprises:
　an actuator connected to a pocket formed in the sleeve through a finger and configured to provide a longitudinal operation force to the sleeve such that the sleeve is configured to be selectively engaged with the first brake gear or the second brake gear.

* * * * *